United States Patent
Gong et al.

(10) Patent No.: US 12,141,130 B2
(45) Date of Patent: Nov. 12, 2024

(54) FENESTRATION UNITS AND METHODS FOR OPERATING THE SAME AS NODES OF A DISTRIBUTED LEDGER NETWORK

(71) Applicant: JELD-WEN, Inc., Charlotte, NC (US)

(72) Inventors: Yuxuan Gong, Lewis Center, OH (US); Paul Hemingfield, Charlotte, NC (US); Franklin Rolles, Charlotte, NC (US)

(73) Assignee: JELD-WEN, Inc., Charlotte, NC (US)

( * ) Notice: Subject to any disclaimer, the term of this patent is extended or adjusted under 35 U.S.C. 154(b) by 113 days.

(21) Appl. No.: 17/938,446

(22) Filed: Oct. 6, 2022

(65) Prior Publication Data

US 2024/0119042 A1    Apr. 11, 2024

(51) Int. Cl.
| | | |
|---|---|---|
| *G06F 16/00* | (2019.01) | |
| *G06F 16/23* | (2019.01) | |
| *G06F 16/27* | (2019.01) | |
| *G06F 21/60* | (2013.01) | |

(52) U.S. Cl.
CPC ........ *G06F 16/2379* (2019.01); *G06F 16/273* (2019.01); *G06F 21/602* (2013.01)

(58) Field of Classification Search
None
See application file for complete search history.

(56) References Cited

U.S. PATENT DOCUMENTS

| | | | |
|---|---|---|---|
| 2019/0146442 A1 | 5/2019 | Cirino | |
| 2020/0143300 A1* | 5/2020 | Weldemariam | G06F 21/572 |
| 2021/0026980 A1* | 1/2021 | Candelario | G06F 21/64 |
| 2021/0234670 A1* | 7/2021 | Leise | G07C 5/0816 |

OTHER PUBLICATIONS

Alsamhi, S.H., "Blockchain for decentralized multi-drone to combat COVID-19 and future pandemics: Framework and proposed solutions", Transactions on Emerging Telecommunications Technologies, Sep. 2021, vol. 32, No. 9: e4255, Published online Mar. 17, 2021.
TechCrunch.com. Shieber, J. "Colu Aims to Bring Blockchain Technology Everywhere", Jan. 27, 2015. Retrieved from Internet: <URL: https://techcrunch.com/2015/01/27/colu-aims-to-bring-blockchain-technology-everywhere/>. Retrieved on Sep. 21, 2022.

* cited by examiner

*Primary Examiner* — Thu Nguyet T Le
(74) *Attorney, Agent, or Firm* — Lorenz & Kopf LLP

(57) ABSTRACT

Fenestration units and method of operation thereof are provided that allow for use of the fenestration units as nodes of a distributed ledger network. The fenestration units include a communication device configured for communication with at least one remote electronic device, a non-transitory, non-volatile memory configured to store computer readable instructions, and a processor in operable communication with the communication device and the memory. The processor is configured to execute the computer readable instructions to function, through the communication device, as a node in a distributed ledger network by storing a local copy of a distributed ledger on the memory, updating the local copy of the distributed ledger, and distributing the local copy to the at least one remote electronic device in response to updating the local copy of the distributed ledger.

18 Claims, 4 Drawing Sheets

FENESTRATION UNITS AND METHODS FOR OPERATING THE SAME AS NODES OF A DISTRIBUTED LEDGER NETWORK

TECHNICAL FIELD

The present invention generally relates to fenestration units, and more particularly relates to fenestration units that may be operated as nodes of a distributed ledger network.

BACKGROUND

Increasingly, physical devices are being produced that have the capability of exchanging data with other devices across communication networks. Commonly referred to as smart devices or Internet of Things (IoT) devices, these devices are quickly replacing conventional products that do not provide such functionality. In the residential setting, these smart/IoT devices may include security cameras, thermostats, HVACs, lights, doorbells, smoke detectors and various other sensors, and appliances to name a few. These smart/IoT devices may include capabilities such as automation of certain functions based on data collected by other devices, providing notifications to users of recommended actions, or the like.

While these smart/IoT devices intend to provide capabilities that many consumers desire, they may suffer from various shortcomings that limit their widespread adoption. For example, access to communication networks may create various security and privacy concerns that may not have been an issue for convention products. Further, automation of these types of devices may produce unsafe situations.

Hence, there is a need for systems and methods that are capable of addressing the shortcomings of smart/IoT devices, such as privacy, security, and safety of the devices and/or their users.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a fenestration unit is provided that includes a communication device configured for communication with at least one remote electronic device, a non-transitory, non-volatile memory configured to store computer readable instructions, and a processor in operable communication with the communication device and the memory. The processor is configured to execute the computer readable instructions to function, through the communication device, as a node in a distributed ledger network by storing a local copy of a distributed ledger on the memory, updating the local copy of the distributed ledger, and distributing the local copy to the at least one remote electronic device in response to updating the local copy of the distributed ledger.

In another embodiment a method is provided that includes operating a fenestration unit as a node in a distributed ledger network by storing a local copy of a distributed ledger on a non-transitory, non-volatile memory of the fenestration unit, updating, with a processor of the fenestration unit, the local copy of the distributed ledger, and distributing, with a communication device of the fenestration unit, the updated local copy to at least one remote electronic device of the distributed ledger network in response to updating the local copy of the distributed ledger.

Furthermore, other desirable features and characteristics of the fenestration unit and the method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
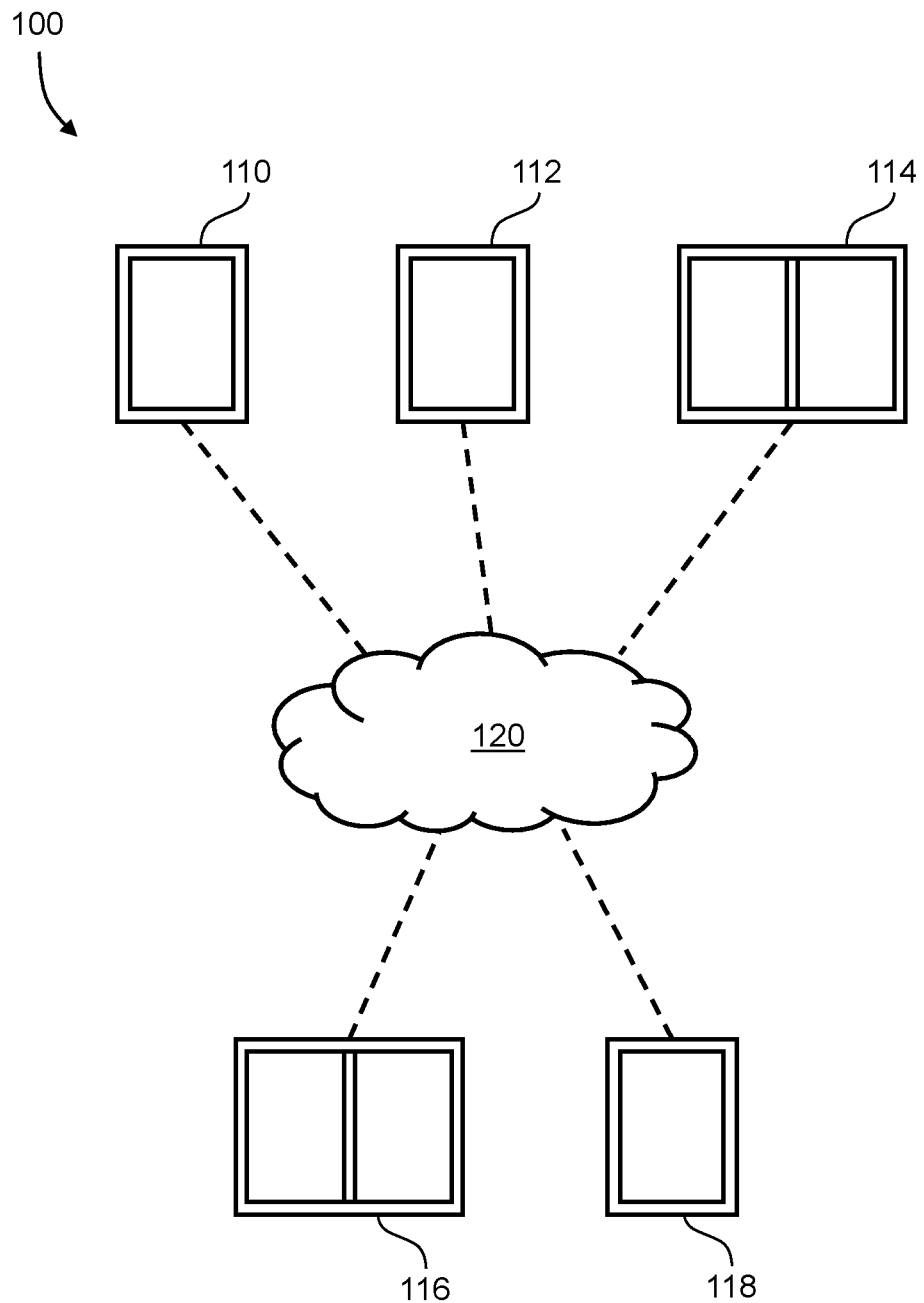
FIG. 1 schematically represents an exemplary network of devices, including fenestration units, operating as nodes for a distributed ledger network in accordance with various embodiments of the invention.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, example embodiments disclosed herein include fenestration units and methods for using the fenestration units as nodes within a distributed ledger network. The fenestration units may include various products, such as but not limited to, windows, doors, sidelites, skylites, etc. The fenestration units may include a frame (e.g., a rectangular frame) that supports one or more members of the unit. For example, a panel of the fenestration unit (e.g., an active panel of a slider door or a window unit) may include a frame that supports a glazing unit, a door skin, or other component of the panel.

To function as nodes of the distributed ledger network, the fenestration units include various components that provide the capability to generate and exchange data across a communication network. In various embodiments, the fenestration units may be considered smart devices and/or Internet of Things (IoT) devices having communication capabilities typically associated with such devices. For the sake of brevity, the following description will focus primarily on aspects of the fenestration units associated with the use thereof as nodes of the distributed ledger network. Therefore, various other components, structures, and functions of the fenestration units will not be discussed in detail herein.

However, it should be understood that the fenestration units may include various components, structures, and functionalities in addition to those described herein including, but not limited to, those known in the art for fenestration units.

Use of the fenestration units as nodes in the distributed ledger network may promote the security, privacy, and safety of the fenestration units and other devices of the distributed ledger network. In some embodiments, the fenestration units may provide for relatively spontaneous decision making based on foot traffic inside of buildings, weather outside of the buildings, building owner preference, usage of devices connected to the distributed ledger network, and/or other collected data. In addition to the convenience provided, such spontaneous decision making may reduce power consumption by the connected devices. In some embodiments, the fenestration units may reduce or eliminate privacy and security concerns related to unencrypted networks and/or centralized authorities (e.g., ledgers located in data centers and/or centralized application systems). In some embodiments, the fenestration units may provide the users (e.g., homeowners) with control over their collected data.

As used herein, a "distributed ledger network" refers to a public or private network of devices, referred to as nodes (computers, servers, clients, etc.), that validate, preserve, and broadcast digital data in the form of a ledger. As used herein, the term "ledger" refers to a list of append-only records. The records are substantially immutable and may hold any type of information, such as financial records or software instructions.

A distributed ledger network generally includes a peer-to-peer (P2P) computer communication network and one or more consensus algorithms configured to reliably replicate the ledger across the nodes. As used herein, the term "consensus" refers to a computational agreement among the nodes in the network as to the content and order of the records in the ledger. Distributed ledger networks may include various technologies configured to replicate, share, and synchronize the ledger such as, but not limited to, record unique transactions in a manner such that they cannot be modified by a single party, confirm transactions, and make available information about those transactions to the parties involved in the transactions. Nonlimiting examples of suitable technologies include, but are not limited to, various types of linear data technologies (e.g., blockchains), various types of nonlinear data technologies (e.g., directed acrylic graph technologies such as hashgraph algorithms), and hybrid technologies.

As used herein, the term "node" refers to a device linked to a network that is authorized to keep track of the distributed ledger and serve as a communication hub for various network tasks. A node's primary job is to determine whether or not a record is legitimate and accept or reject it (i.e., validating the record), save and store the record (e.g., preserving the record), and/or share the record to other nodes (i.e., broadcasting the record). Each node in the network may be allocated a unique identifier to distinguish an individual node from other nodes. In some examples, only "full nodes" must store an entirety of the distributed ledger. The full nodes are in charge of validating records and transactions. In contrast, "lightweight nodes" only store record headers to verify records. In some embodiments, a node may be an "online node" that is assigned to send updates across the network consistently and always to be online, or the node may be an offline node that is only needed to download the most recent copy of the ledger every time the offline node rejoins the network to stay in sync with the rest of the nodes. This process is termed synchronizing.

Distributed ledger networks typically include multiple nodes in which each of the nodes replicate and store an identical copy of the ledger, and then update their copy of the ledger independently of the other nodes. When a new record is added to the ledger, the updating node broadcasts the addition across the distributed ledger network such that it is received by all of the other nodes. Each of the nodes independently validates the new record. Thereafter, all of the nodes use a consensus algorithm to determine an accurate version of the ledger. Once a consensus has been determined, all of the nodes update their copy of the ledger with the accurate version. The integrity of the ledger is maintained via cryptographic keys and signatures.

For certain technologies, the cryptographic keys use "asymmetric key encryption," also known as "public key encryption," "public key cryptography," and "asymmetric cryptography," which refer to a cryptographic system that uses pairs of mathematically related keys, one public and one private, to authenticate messages. The "private key" is kept secret by the sender of a message or document and is used to encrypt the message or document. The "public key" is shared with the public and can be used to decrypt the message or document. The term "signature" refers to a mathematically-based system for demonstrating the authenticity of a message or document by ensuring that it was sent from the identified node and not tampered with by an intermediary. Asymmetric key encryption may be used to implement digital signatures.

In some embodiments, the fenestration unit is configured to function as a node for a blockchain network, that is, a plurality of nodes operating with a blockchain technology to maintain the ledger. In blockchain technologies, the records of the ledger are called blocks, and each of the blocks are linked using cryptography. Each block contains a cryptographic hash (digest) of the previous block, a timestamp, and record data. As used herein, the term "hash" refers to a cryptographic algorithm to produce a unique or effectively unique value, usually from an arbitrary, variable-sized input. Hashes are repeatable and unidirectional, meaning the algorithm always produces the same hash from the same input, but the original input cannot be determined from the hash. The timestamp proves that the record data existed when the block was created.

Since each block contains information about the block previous to it, the records are substantially irreversible in that, once they are added to the ledger, the data in any given block cannot be altered retroactively without altering all subsequent blocks. Although blockchain records are not unalterable, since forks are possible, blockchains may be considered secure by design and exemplify a distributed computing system with high Byzantine fault tolerance. As used herein, the term "fork" refers to a split in a blockchain where two different valid successor blocks have been mined and are present in the blockchain, but consensus has not yet been reached as to which version of the ledger is correct. As used herein, the term "mining" refers to a process by which new blocks are verified by solving a cryptographic puzzle. Once the puzzle has been solved and the block has been added to the blockchain, the block is referred to as having been "mined." Various consensus algorithms may be used such as, but not limited to, Proof-of-Stake, Proof-of-Elapsed Time, Proof-of-Work, Practical Byzantine Fault Tolerance, etc.

In some embodiments, the fenestration unit is configured to function as a node for a hashgraph network, that is, a plurality of nodes operating with a hashgraph technology to maintain the ledger. Unlike blockchains, hashgraphs do not bundle data into blocks or use miners to validate transactions. Instead, hashgraphs use a "gossip about gossip" protocol where the individual nodes on the network "gossip" about transactions to create directed acyclic graphs that time-sequence transactions. As used herein, the term "gossip" refers to a transfer or synchronization of information from one node to another random node that is used to ensure that all data has been circulated to all the members of the network. Each "gossip" message contains one or more records (e.g., transactions) plus a timestamp, a digital signature, and cryptographic hashes of, for example, two earlier events. Hashgraphs may use an asynchronous Byzantine Fault-Tolerant (aBFT) consensus algorithm. For example, virtual voting to gain network consensus. As used herein, the phrase "virtual voting" refers to an algorithm in which each node predicts what other nodes would have voted for, even without voting. That is, since the gossip about gossip mechanism provides each node with the information available to the other nodes, each node can predict how the other node would vote, which results in electronic voting or virtual voting without actually sending voting messages across the network.

Referring now to FIG. 1, a network 100 is represented according to example embodiments of the present disclosure. The network 100 is illustrated as including a first fenestration unit 110, a second fenestration unit 112, a third fenestration unit 114, a fourth fenestration unit 116, a fifth fenestration unit 118, and various other devices (collectively referred to hereinafter as the other devices 120) that may each be other fenestration units or other types of electronic devices. Although the fenestration units 110, 112, 114, 116, and 118 are represented as windows and doors, it will be appreciated that the fenestration units 110, 112, 114, 116, and 118 and/or any of the other devices 120 may be a skylight or other type of fenestration unit without departing from the scope of the present disclosure. The other devices 120 may include, but are not limited to, various smart/IoT devices such as security cameras, thermostats, HVACs, lights, doorbells, smoke detectors and various other sensors, and appliances.

Figure 2:
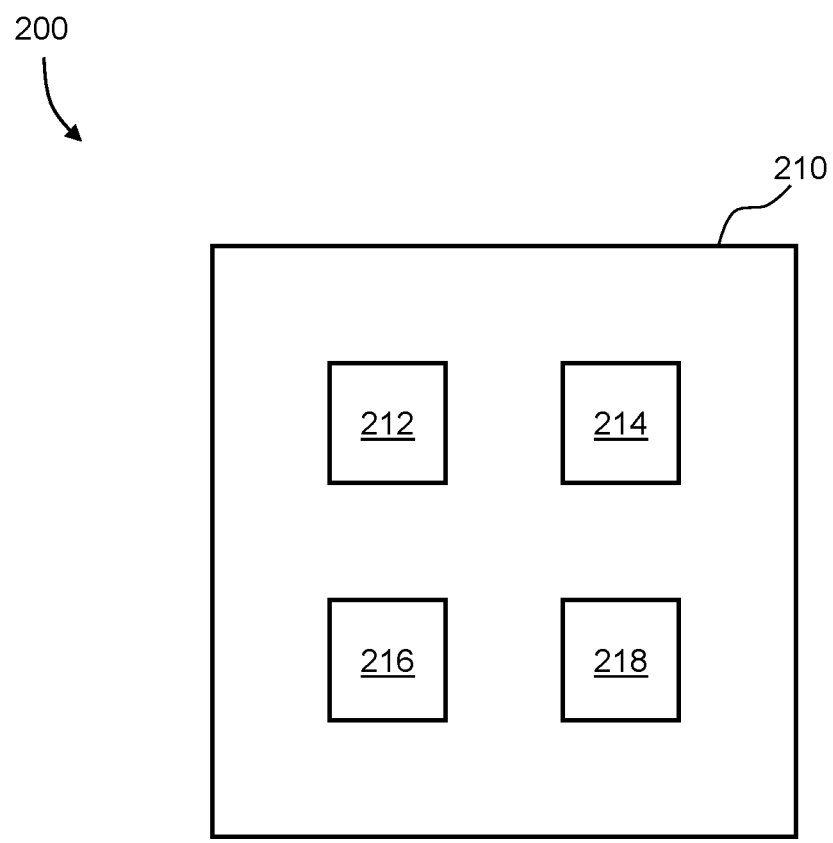
FIG. 2 is a block diagram representing an exemplary system of one of the fenestration units of FIG. 1 comprising a computing device for performing tasks associated with the distributed ledger network.

In general, the fenestration units 110, 112, 114, 116, and 118 each include a frame and a panel that is supported by the frame for movement between a closed position and an open position. In addition, the fenestration units 110, 112, 114, 116, and 118, as well as the other devices 120, each include one or more components configured to provide the capability of functioning as a node a distributed ledger network operating within the network 100. As a nonlimiting example, FIG. 2 represents a system 200 that includes a computing device 210 including various operatively coupled components such as, but not limited to, at least one non-volatile, non-transitory memory 212, at least one processor 214, and at least one communication device 216.

The memory 212 is configured to store computer-readable instructions (i.e., executable instructions), for execution by the at least one processor 214, that when executed, cause the at least one processor 214 to operate in accordance with one or more embodiments of one or more processes of the present disclosure, such as the steps of the process discussed further below in connection with FIG. 4. Optionally, the memory 212 may be configured to store various other computer readable data. The memory 212 may be any suitable non-volatile, non-transitory memory such as, but not limited to, programmable chips such as read-only memory (ROM), PROMs (programmable read-only memory), EPROMs (electrically PROM), EEPROMs (electrically erasable PROM), flash memory (thumb drives, solid-state drives), or any other electric, magnetic, optical, or combination memory devices capable of storing data, some of which represent executable instructions. The executable instructions may include various operating system instructions that, when executed by the at least one processor 214, may provide a kernel, libraries (e.g., application programming interfaces or "APIs"), an application layer or "user space" within which the various applications are executed, and/or an IP protocol stack.

The processor 214 is configured to fetch and execute the executable instructions stored in the memory 212 and thereby perform computation and control functions in accordance with one or more embodiments of one or more processes of the present disclosure, among other capabilities including, but not limited to, performing logic, calculations, methods and/or algorithms, and generating data based on the logic, calculations, methods, and/or algorithms. The processor 214 can be any custom made or commercially available processor, such as but not limited to, a central processing unit (CPU), a graphics processing unit (GPU), a semiconductor-based microprocessor (e.g., in the form of a microchip or chip set), an application-specific integrated circuit (ASIC), a field-programmable gate array (FPGA), a microcomputer, a microcontroller, a digital signal processor, a state machine, a logic circuit, any combination thereof, or generally any device that manipulates signals based on the executable instructions. The processor 214 may include or be operatively coupled to volatile memory 218 such as random access memory (RAM).

The communication device 216 is configured to transmit and receive signals, and/or establish communication connections with, external sources (e.g., remote electronic devices). The communication device 216 may include one or more transmitters, receivers, and/or transceivers configured to communicate with external sources using various wired or wireless technologies. As an example, the communication device 216 may be configured to receive and/or transmit data with external sources through one or more physical electrical connections via data ports (not shown) of the fenestration unit 110/112/114/116/118 using wired communication technologies (e.g., ethernet, high-definition multimedia interface (HDMI; EIA/CEA-861 signals)). As another example, the communication device 216 may be configured to receive and/or transmit data with external sources using one or more wireless communication technologies (e.g., radio waves, Wi-Fi, cellular data services, mobile broadband, Bluetooth®). In various embodiments, the communication device 216 includes at least one integrated circuit configured to establish a wireless connection to communicate with external sources through a Wi-Fi wireless technology network.

The memory 212, the processor 214, the communication device 216, and any other electronic devices of the fenestration unit 110/112/114/116/118 may be operatively coupled by an internal communication bus. The bus serves to transmit programs, data, status, and other information or signals between the various components of the fenestration unit 110/112/114/116/118. The bus can be any suitable physical or logical means of connecting computer systems and components. This includes, but is not limited to, direct hard-wired connections, fiber optics, infrared, and wireless bus technologies. As used herein, components may be "operatively coupled" when information can be sent between two such components, even though there may be one or more intermediate or intervening components between, or along the connection path. Therefore, any of the various electronic components of the fenestration unit 110/112/114/116/118, and in other example network entities and devices described herein, may be understood herein to be operatively coupled to each other where appropriate, and to be executing on one or more processors that are further operatively coupled to a memory that stores executable instructions (also referred to as "software code" or "code") for implementing the various components. Operative coupling may also exist between the various electronic devices of the fenestration unit 110/112/114/116/118 and physical components and/or system interfaces of the fenestration unit 110/112/114/116/118.

Figure 3:
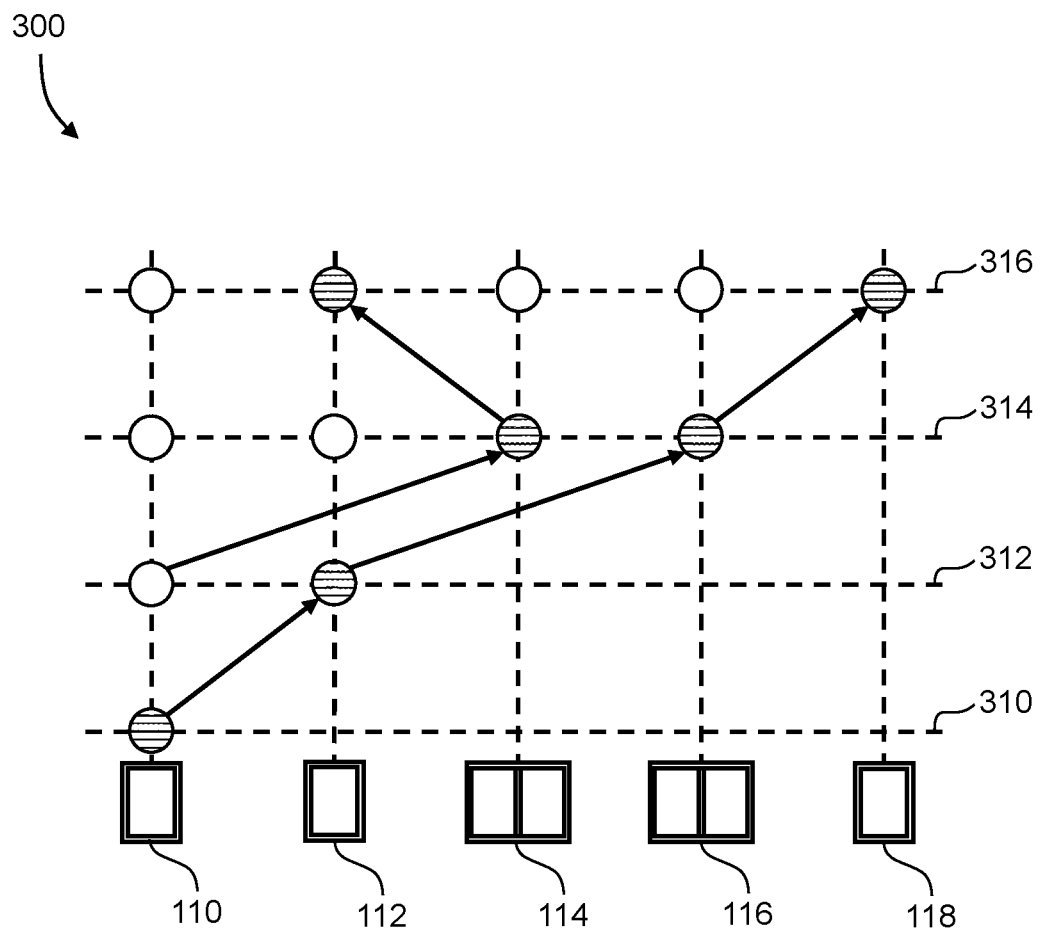
FIG. 3 schematically represents a nonlimiting example of operations occurring on the network of FIG. 1.

Referring now to FIG. 3, a nonlimiting example of operation of the fenestration units 110, 112, 114, 116, and 118 is illustrated in which the distributed ledger network operating on the network 100 is a hashgraph network. In this example, circles located on vertical lines extending from each of the fenestration units 110, 112, 114, 116, and 118 represent local copies of a distributed ledger shared on the network 100 and stored on the corresponding one of the fenestration units 110, 112, 114, 116, or 118, horizontal lines represent times at which new data is saved to a ledger (e.g., in the event of a change to one of the fenestration units 110, 112, 114, 116, and 118), arrows between the circles represent transmitted data, and shading within the circles represent new data being added to the ledger at each of the times. Notably, the other devices 120 are omitted from FIG. 3 for clarity; however, it should be understood that the other devices 120 may perform actions similar to those described in relation to the fenestration units 110, 112, 114, 116, and 118.

At time 310, the fenestration unit 110 changes a transparency of the panel thereof in response to sensing a high solar gain (e.g., due to a hot summer day). This action is recorded to the local copy of the ledger on the fenestration unit 110 and the updated ledger is transmitted to the fenestration unit 112. At time 312, the fenestration unit 112 changes a transparency of the panel thereof in response to sensing a low solar gain (e.g., due to a cold day). This action is recorded to the local copy of the ledger on the fenestration unit 112 and the updated ledger is transmitted to the fenestration unit 116. In addition, the fenestration unit 110 updates its local copy of the ledger upon receiving notice of the changes made by the fenestration unit 112 and transmits (i.e., gossips) the updated ledger to the fenestration unit 114.

At time 314, the fenestration units 114 and 116 each change transparencies of their respective panels based on previously established data on the hashgraph network. The fenestration units 114 and 116 record the changes to their local copies of the ledger. The fenestration unit 114 transmits the changes to the fenestration unit 112 and the fenestration unit 116 transmits the changes to the fenestration unit 118. Notably, these actions are based on network data rather than locally sensed conditions. As such, these actions are illustrative of smart decisions made as a result of the gossips. In addition, the fenestration unit 110 updates its local copy of the ledger upon receiving notice of the changes made by the fenestration units 114 and 116. At time 316, each of the fenestration units 110, 112, 114, 116, 118 has an identical local copy of the ledger. Any subsequent change to the ledger will result in an update to all of the local copies of the ledger.

Figure 4:
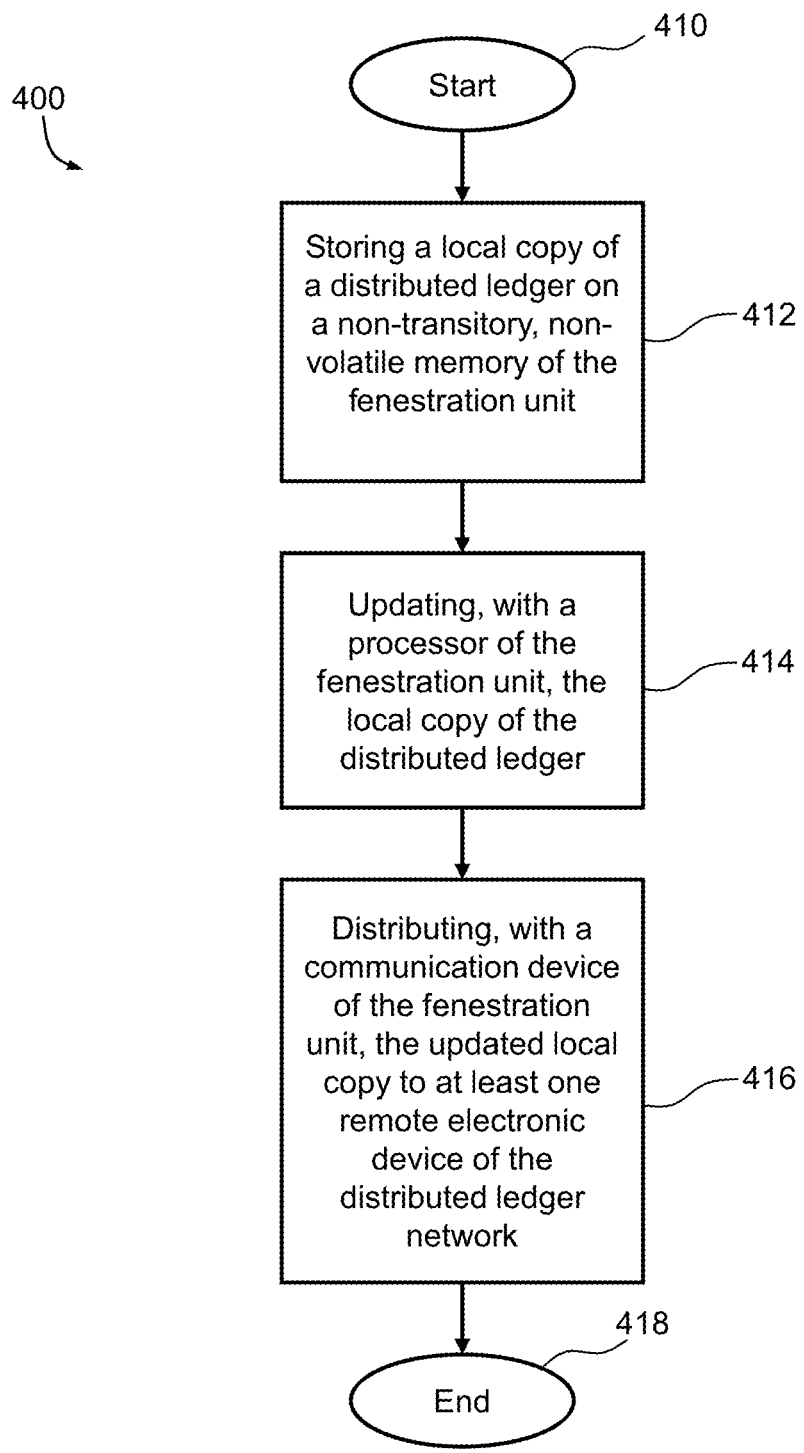
FIG. 4 is a flow chart representing an exemplary method of operating a fenestration unit as a node of a distributed ledger network in accordance with various embodiments of the invention.

Referring now to FIG. 4, a nonlimiting example of a method 400 is presented that includes steps suitable for operating a fenestration unit (e.g., one or more of the fenestration units 110, 112, 114, 116, and 118) as a node in a distributed ledger network. In step 410, the method 400 may start. The method 400 includes storing, at 412, a local copy of a distributed ledger on a non-transitory, non-volatile memory of the fenestration unit. The method 400 further includes updating, with a processor of the fenestration unit, the local copy of the ledger at 414. The method 400 further includes distributing, with a communication device of the fenestration unit, the updated local copy of the ledger to at least one remote electronic device of the distributed ledger network in response to updating the local copy of the ledger at 416. The method 400 may end at 418.

In various embodiments, the method 400 may further include sensing, with a sensor of the fenestration unit, a condition of the fenestration unit or an environment affecting the fenestration unit, providing the sensed condition to the processor, performing, by the processor, an action based on the sensed condition that causes a change to the fenestration unit, and updating the local copy of the ledger to record the action.

In various embodiments, the method 400 may further include receiving, by the communication device, an updated copy of the ledger from an external source (e.g., a remote electronic device), and updating, by the processor, the local copy of the ledger based on the received updated copy of the ledger. In such embodiments, the method 400 may include performing, by the processor, a validity check on the received updated copy of the ledger, and updating, by the processor, the local copy of the ledger in response to a determination that the received updated copy of the ledger is valid. In such embodiments, the method 400 may include performing, by the processor, an action based on the received updated copy of the ledger that causes a change to the fenestration unit, and updating, by the processor, the local copy of the ledger to record the action. Nonlimiting examples of such action may include actuating a locking mechanism to lock or unlock the fenestration unit, actuating a mechanism to open or close the fenestration unit, and/or adjusting light transmission or insulation of a transparent member of the fenestration unit.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fenestration unit comprising:
a communication device configured for communication with at least one remote electronic device;
a non-transitory, non-volatile memory configured to store computer readable instructions; and
a processor in operable communication with the communication device and the memory, wherein the processor is configured to execute the computer readable instructions to function, through the communication device, as a node in a distributed ledger network by storing a local copy of a distributed ledger on the memory, updating the local copy of the distributed ledger on the memory, and distributing the local copy of the distributed ledger from the memory to the at least one remote electronic device in response to updating the local copy of the distributed ledger on the memory, wherein the processor is configured to receive, by the communication device, an updated copy of the distributed ledger from the at least one remote electronic device, and update the local copy of the distributed ledger on the memory based on the updated copy, wherein the processor is configured to perform an action based on the received updated copy of the distributed ledger that causes a physical change to the fenestration unit, and update the local copy of the distributed ledger on the memory to record the action.

2. The fenestration unit of claim 1, wherein the distributed ledger network is a hashgraph network.

3. The fenestration unit of claim 2, wherein the processor is configured to use a gossip about gossip protocol and an asynchronous Byzantine Fault-Tolerant consensus algorithm.

4. The fenestration unit of claim 3, wherein the consensus algorithm is a virtual voting algorithm.

5. The fenestration unit of claim 1, further comprising at least one sensor configured to sense a condition of the fenestration unit or an environment affecting the fenestration unit, wherein the at least one sensor is in operable communication with the processor such that the sensed condition is transmitted to or accessible by the processor, wherein the processor is configured to perform, based on the sensed condition, an action that causes a change to the fenestration unit and the processor is configured to update the local copy of the distributed ledger to record the action.

6. The fenestration unit of claim 5, wherein the at least one sensor includes a temperature sensor, a humidity sensor, a light intensity sensor, a barometric pressure sensor, or a moisture sensor.

7. The fenestration unit of claim 1, wherein the processor is configured to perform a validity check on the received updated copy of the distributed ledger, and update the local copy of the distributed ledger in response to a determination that the received updated copy of the distributed ledger is valid.

8. The fenestration unit of claim 1, wherein the fenestration unit is a window, a door, a sidelite, or a skylite.

9. The fenestration unit of claim 8, wherein the action that the processor is configured to perform based on the received updated copy of the distributed ledger includes one or more of actuating a locking mechanism to lock or unlock the fenestration unit, actuating a mechanism to open or close the fenestration unit, and/or adjusting light transmission or insulation of a transparent member of the fenestration unit.

10. A method comprising:
operating a fenestration unit as a node in a distributed ledger network by:
storing a local copy of a distributed ledger on a non-transitory, non-volatile memory of the fenestration unit;
updating, with a processor of the fenestration unit, the local copy of the distributed ledger on the memory;
distributing, with a communication device of the fenestration unit, the updated local copy of the distributed ledger from the memory to at least one remote electronic device of the distributed ledger network in response to updating the local copy of the distributed ledger on the memory;
receiving, by the communication device, an updated copy of the distributed ledger from a remote electronic device;
updating, by the processor, the local copy of the distributed ledger on the memory based on the received updated copy;
performing, by the processor, an action based on the received updated copy of the distributed ledger that causes a physical change to the fenestration unit; and
updating, by the processor, the local copy of the distributed ledger on the memory to record the action.

11. The method of claim 10, wherein the distributed ledger network is a hashgraph network.

12. The method of claim 11, further comprising, by the processor, using a gossip about gossip protocol to send and receive copies of the distributed ledger and an asynchronous Byzantine Fault-Tolerant consensus algorithm to determine an accuracy of the copies of the distributed ledger.

13. The method of claim 12, wherein the consensus algorithm is a virtual voting algorithm.

14. The method of claim 10, further comprising:
sensing, with a sensor of the fenestration unit, a condition of the fenestration unit or an environment affecting the fenestration unit;
providing the sensed condition to the processor;
performing, by the processor, an action that causes a change to the fenestration unit based on the sensed condition; and
updating, by the processor, the local copy of the distributed ledger on the memory to record the action.

15. The method of claim 14, wherein the sensor includes a temperature sensor, a humidity sensor, a light intensity sensor, a barometric pressure sensor, or a moisture sensor.

16. The method of claim 10, further comprising:
performing, by the processor, a validity check on the received updated copy of the distributed ledger; and
updating, by the processor, the local copy of the distributed ledger in response to a determination that the received updated copy of the distributed ledger is valid.

17. The method of claim 10, wherein the fenestration unit is a window, a door, a sidelite, or a skylite.

18. The method of claim 17, wherein performing, by the processor, the action based on the received updated copy of the distributed ledger includes one or more of actuating a locking mechanism to lock or unlock the fenestration unit, actuating a mechanism to open or close the fenestration unit, and/or adjusting light transmission or insulation of a transparent member of the fenestration unit.

\* \* \* \* \*